United States Patent
Matsuhisa

(10) Patent No.: US 9,653,976 B2
(45) Date of Patent: May 16, 2017

(54) METHOD OF MAKING A LUNDELL CLAW ROTOR WITH RESIN

(75) Inventor: Hiroki Matsuhisa, Anjo (JP)

(73) Assignee: DENSO CORPORATION, Kariya (JP)

( * ) Notice: Subject to any disclaimer, the term of this patent is extended or adjusted under 35 U.S.C. 154(b) by 863 days.

(21) Appl. No.: 13/409,674

(22) Filed: Mar. 1, 2012

(65) Prior Publication Data

US 2012/0223598 A1 Sep. 6, 2012

(30) Foreign Application Priority Data

Mar. 1, 2011 (JP) .................... 2011-044256

(51) Int. Cl.
*H02K 15/02* (2006.01)
*H02K 15/12* (2006.01)
*H02K 3/32* (2006.01)

(52) U.S. Cl.
CPC ............ *H02K 15/12* (2013.01); *H02K 3/325* (2013.01); *H02K 15/022* (2013.01); *Y10T 29/49012* (2015.01)

(58) Field of Classification Search
CPC ........ H02K 15/12; H02K 3/325; H02K 1/243; H02K 3/52; H02K 3/528; H02K 15/022; H02K 15/105; H02K 15/125; Y10T 29/49012

See application file for complete search history.

(56) References Cited

U.S. PATENT DOCUMENTS

| 5,778,512 A | 7/1998 | Ichikawa et al. |
| 6,172,434 B1 | 1/2001 | Oohashi et al. |
| 2003/0137208 A1* | 7/2003 | York et al. ............ 310/194 |
| 2009/0236926 A1* | 9/2009 | Tokizawa ............ 310/194 |

FOREIGN PATENT DOCUMENTS

| JP | U-5-95188 | 12/1993 |
| JP | A-9-182337 | 7/1997 |
| JP | A-2001-37180 | 2/2001 |
| JP | A-2005-318692 | 11/2005 |
| JP | A-2007-151243 | 6/2007 |
| JP | A-2008-29102 | 2/2008 |
| JP | B2-4492303 | 4/2010 |
| JP | 4492303 B2 * | 6/2010 ............ H02K 15/12 |

OTHER PUBLICATIONS

JP 4492303 B2 Machine Translation.*
PTO 15-0923, Certified Translation of JP 4492303.*

* cited by examiner

*Primary Examiner* — Burton Mullins
(74) *Attorney, Agent, or Firm* — Oliff PLC

(57) ABSTRACT

A method of manufacturing a rotor for an electric rotating machine is provided. According to the method, resin is applied and impregnated to a surface of a winding through windows of a wavy clearance between pawl parts opposed to each other of a pair of pole cores. Uncured resin having fluidity is dropped to at least one part area of the outer surface of the winding. The uncured resin, immediately after dropping, is spread on the outer surface of the winding, and the uncured resin adheres to the outer surface of the winding other than the part area.

10 Claims, 7 Drawing Sheets

(A—A)

PLURALLY DIVIDED DROPPING A

RESIN IMPREGNATION AREA

PLURALLY DIVIDED DROPPING B

RESIN IMPREGNATION AREA

PLURALLY DIVIDED DROPPING C

RESIN IMPREGNATION AREA (D-D)

(C–C)

(B—B)

METHOD OF MAKING A LUNDELL CLAW ROTOR WITH RESIN

CROSS-REFERENCE TO RELATED APPLICATION

This application is based on and claims the benefit of priority from earlier Japanese Patent Application No. 2011-44256 filed Mar. 1, 2011, the description of which is incorporated herein by reference.

BACKGROUND

Technical Field

The present invention relates to a method of manufacturing a rotor for an electric rotating machine including a Lundell type rotor core, such as an alternator for a vehicle, and the rotor. In particular, the present invention relates to a method of dropping resin to a winding of a magnetic coil.

Related Art

As a rotor for an alternator for a vehicle, an assembly (Lundell type rotor core) is used in which cylindrical boss parts, disc parts, and a pair of iron cores (pole cores) are assembled so as to be opposed to each other. The disc parts extend in the radial direction from ends of the boss parts. The cores have a plurality of (e.g. eight) pawl parts extending from the peripheries of the disc parts in the direction toward other ends of the boss parts at an equal distance. V-shaped grooves (V-grooves) are formed between the adjacent pawl parts so as to reach the peripheries of the disc parts. The pawl parts of one of the cores are arranged in a state where the pawl parts are engaged with the V-grooves of the other of the cores via required clearances. Thereby, continuous clearances having a waveform shape are formed. A magnetic coil is accommodated inside the engaged pawl parts in a state where the magnetic coil is fitted to the boss parts from the outside. A shaft is pressed into a combination of a pair of the cores and the magnetic coil, thereby forming an integrated assembly.

The magnetic coil includes an insulating bobbin and a winding in which a conductive line is cylindrically wound around the insulating bobbin. A pair of the pole cores and the magnetic coil are integrated by pressing the shaft into the axis thereof. The insulating bobbin is manufactured by injection molding from resin such as nylon, and has a cylindrical drum around which the winding is wound, and flanges extending in the radial direction from the both ends of the drum.

Each of the flanges includes a collar part and tongue parts. The collar part is brought into contact with the inner face of the disc part of the pole core and the end face of the cylindrical winding. The tongue parts radially extend from the collar part so as to correspond to the plurality (e.g. six) of pawl parts and are brought into contact with the inner wall surfaces of the pawl parts. A V-shaped notch corresponding to the V-groove is formed between the adjacent tongue parts. In addition, one of the flanges is provided with a protrusion at a position of the bottom of the notch. The protrusion engages with the bottom part of the V-grooves (refer to Japanese Patent No. 4492303). The protrusions act as detents for the magnetic coil, while two of the protrusions opposed to each other act as locking parts, which lock outgoing lines of a winding start portion and a winding end portion of the winding, to prevent the winding from loosening.

In the assembly including the pair of the cores, the magnetic coil, and the shaft, a wavy groove (wavy clearance) is provided along the periphery of a pawl part having a cylindrical surface. In the wavy groove, the peripheries of both the disc parts are located at the bottoms of the V-grooves, and the periphery of a pawl part inside both the disc parts is formed with openings (windows) having a substantial parallelogram shape. The outer surfaces of the winding of the magnet coil are exposed from the windows. Thermoplastic resin, which covers the periphery of the winding and is impregnated into the winding, is applied from the wavy clearance to the assembly in an uncured state (in process of solation or gelation). The uncured resin applied to the winding is impregnated into the whole winding. Next, the uncured resin is heated in an air heating furnace for a predetermined time at a predetermined temperature, whereby the winding is thermally hardened and fixed.

In Japanese Patent No. 4492303, a method of impregnating resin into a rotor is disclosed which includes (a) heating process, (b) main impregnation process, and (c) thermal insulation fixing. As the main impregnation process, a technique is disclosed in which resin is dropped from a nozzle to a clearance between pawl parts (wavy clearance) while a rotor is rotated about an axis (shaft) in order to impregnate resin into the winding of the rotor.

In JP-A-2008-29102, a configuration is disclosed in which a bobbin of a rotor has a protrusion extending to the outside, and the protrusion engages with the bottom part of a V-groove of a pole core to prevent the rotation of the bobbin. According to this configuration, a problem has arisen that when resin is impregnated into a clearance between the protrusion and the bottom part of the V-groove and is fixed, a crack is generated in the protrusion, which lowers the electrical insulating properties of a magnetic coil.

JP-A-2007-151243 disclose a method of turning varnish (resin) into a gel by electrically heating a winding, and a drop impregnation method of dropping varnish to be impregnated, to improve reliability of a magnet coil. According to the method, a problem has arisen that when a large amount of varnish is dropped to the magnet coil in order to increase the amount of impregnation of varnish, the varnish overflows from a clearance between pawl parts, whereby a large amount of the varnish adheres to a pole core.

According to the drop impregnation method disclosed in JP-A-2007-151243, resin transfers on the surface of the winding and overflows to the pawl parts of the pole core. Thereby, the possibility, which is disclosed in JP-A-2008-29102, is easily increased that the resin is impregnated into the clearance between the protrusion and the bottom part of the V-groove and is fixed.

The technique, in which uncured resin having fluidity is dropped from a nozzle to a clearance between pawl parts (wavy clearance) while a rotor is rotated about an axis (shaft) in order to impregnate resin into the winding of the rotor, has high productivity. However, a large amount of resin to be spread and penetrated to the whole winding flows to a narrow area immediately below the drop. Hence, problems easily arise that resin dropped around the tip of the pawl of the pole core is impregnated to a clearance between the protrusion of the bobbin and the bottom part of the V-groove of the pole core, as disclosed in JP-A-2008-29102, and that the dropped uncured resin overflows and adheres to the pole core, as disclosed in JP-A-2007-151243.

SUMMARY

An embodiment provides a method of manufacturing a rotor for an electric rotating machine, the method being capable of dropping an appropriate quantity of uncured resin to a surface of a winding. That is, problems are prevented that resin is impregnated to a clearance between a protrusion of a bobbin and the bottom part of a V-groove of a pole core and is fixed, and that the uncured resin overflows and adheres to the pole core, thereby impregnating required minimum resin to a magnetic coil.

As an aspect of the embodiment, a method of manufacturing a rotor for an electric rotating machine is provided. The method drops uncured resin to a surface of a winding and impregnates the uncured resin into the winding of a Lundell type rotor core, in which a magnetic coil including a bobbin and a winding in which a conductive line is wound around the bobbin is disposed between a pair of pole cores opposed to each other, and the pole cores and the magnetic coil are fixed by a shaft. The pole core includes a cylindrical boss part, a disc part extending from an outside face of one end of the boss part, and a plurality of pawl parts extending from the periphery of the disc part to the other end. A V-shaped groove is formed between the adjacent pawl parts so as to reach the periphery of the disc part. The pawl part of one of the pole cores is engaged with the V-shaped groove of the other of the pole cores via a required clearance. Thereby, a wavy clearance continuous in the circumferential direction is formed. The wavy clearance has a window having a substantial parallelogram shape from which an outer surface of the winding is exposed. The uncured resin is dropped to the surface of the winding through the window and is impregnated into the winding. The method includes: dropping the uncured resin to at least one part area of the outer surface of the winding, spreading the uncured resin, immediately after dropping, on the outer surface of the winding, and impregnating the uncured resin into the outer surface of the winding other than the part area.

DETAILED DESCRIPTION OF THE PREFERRED EMBODIMENTS

With reference to the accompanying drawings, hereinafter are described embodiments of the present invention.

Figure 1:
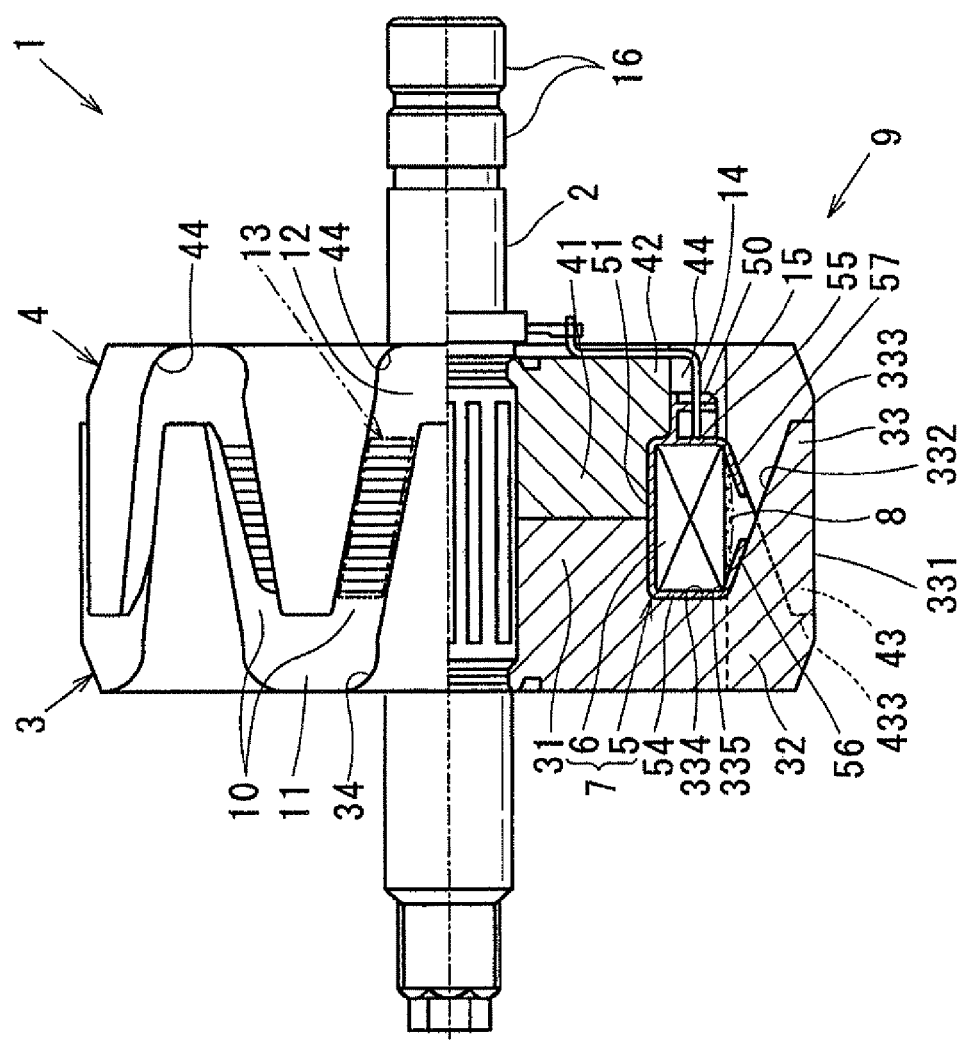
FIG. 1 is a partial sectional view, in which a main part is enlarged, of a rotor for an electric rotating machine.

FIG. 1 shows a rotor 1 for an alternator for a vehicle. The rotor 1 is driven by an engine and operates as a field element for generation of electricity. The rotor 1 includes a shaft 2 and a pair of pole cores 3 and 4 which are opposed to and pressed into each other with respect to the shaft 2. Between the pole cores 3 and 4, a magnetic coil 7 is disposed which includes electrical insulating bobbin 5 and a winding 6 in which a conductive line is densely wound around the bobbin 5. The winding 6 is fixed by thermoset resin (hereinafter, referred to as epoxy resin) 8 such as epoxy resin.

The pole cores 3 and 4 have shapes identical to each other and include boss parts 31, 41 and disc parts 32, 42. The boss parts 31, 41 have a cylindrical shape so as to be fitted to the shaft 2 from the outside. The disc parts 32, 42 are respectively spread from the outside end faces of the boss parts 31, 41 in the radial direction. A plurality of pawl parts 33, 43, which form pawl shaped magnetic poles, extend from the peripheries of the disc parts 32, 42 in the axial direction (the direction toward the inside). In FIG. 1, eight pawl parts 33 of the pole core 3 and eight pawl parts 34 of the pole core 4 are formed so as to have the identical shapes and to be arranged at an equal distance. The outer surfaces of the pawl parts 33, 43 are positioned inside a cylindrical surface whose axis is the same as that of the shaft 2.

In the pawl part 33 (43), an external wall surface 331 is the cylindrical surface described above. An internal wall surface 332 is a substantial conic surface whose axis is the same as that of the shaft 2 and whose radius (inner diameter) gradually increases toward the end thereof. The width of the pawl part 33 (43) in the circumferential direction gradually decreases toward the end thereof (inside in the axial direction), whereby the pawl part 33 (43) has a wedge shape. The end of the pawl part 33 (43) is an end face 333 extending in the radial direction. The internal wall surface 332 of the pawl part 33 (43) is connected with an inner wall surface 334 of the disc part 32 by a curved surface 335 having a small radius of curvature. Substantial U-shaped or substantial V-shaped grooves (V-grooves) 34, 44 are formed between the adjacent pawl parts 33 and 43 so as to cut into the peripheries of the disc parts 32, 42.

The pair of pole cores 3 and 4 are arranged so as to be opposed to each other. End faces of the boss parts 31, 41 are butted against each other. Thereby, a Lundell type rotor core is configured. In this state, the shaft 2 is pressed into the pole cores 3, 4 and the magnetic coil 7, thereby forming an assembly 9. The pawl parts 33 of the pole core 3 and the pawl parts 43 of the pole core 4 are arranged so as to be alternately meshed with each other with required clearances.

In addition, the end faces 333 of the pawl parts 33 of the pole core 3 are opposed to the bottom parts of the V-grooves 44 of the pole core 4. Similarly, the end faces 433 of the pawl parts 43 of the pole core 4 are opposed to the bottom parts of the V-grooves 34 of the pole core 3. Hence, a cylindrical wavy clearance 10 having a substantial trapezoidal waveform is formed in the outer surfaces of the assembly 9. The magnetic coil 7 is accommodated in a hollow part surrounded by the boss parts 31, 41 of the pole cores 3, 4, the disc parts 32, 42, and the pawl parts 33, 43.

The ends of the pawl parts 33, 43 of the pole cores 3, 4 are reached to intermediate positions of the disc parts 42, 32 of the pole cores 4, 3 in the axial direction (intermediate positions of the V-grooves 34, 44). The wavy clearance 10 has U-shaped or V-shaped turning parts 11, 12 which are turned at lateral positions of the disc parts 42, 32. Windows 13, from which the magnetic coil 7 is exposed, are formed between the turning parts 11 and 12. The window 13 has a parallelogram shape. Uncured resin (thermoset resin such as epoxy resin) 8, which has fluidity during the process of gelation (sol state), is dropped on the outer surface of the magnetic coil 7 through the window 13. The dropped epoxy resin 8 spreads on the surface of the winding 6 by gravity and surface tension and is impregnated into the winding 6. Next, the dropped epoxy resin 8 is thermally hardened to fix the surface and the interior of the winding 6.

The insulating bobbin 5 is molded from resin such as nylon. The bobbin 5 has a cylindrical body 51 and a number of tongue parts 56, 57. The winding 6 is wound around the body 51. The tongue parts 56, 57 extend in the radial direction from the peripheries of two collar parts 54, 55 extending from the both ends of the body 51 to the outside in the radial direction. The tongue parts 56, 57 have shapes approximate to inner surfaces of the pawl parts 33, 43, and are formed at an equal distance so as to correspond to the pawl parts 33, 43.

When the winding 6 is wound around the body 51, peripheries of the end faces of the winding 6 reach the positions of the peripheries of the circular plate-like collar parts 54, 55. The lateral surface of the collar part 55 is provided with a V-shaped lack portion, at the deepest back portion of which protrusions 50 are provided. The protrusion 50 engages with the bottom part of the V-groove 34 (44) of the pole core 3(4) to stop the insulating bobbin 5 from rotating. Two of the protrusions 50 serve as locking parts 15 which lock outgoing lines 14 of a winding start portion and a winding end portion of the magnetic coil. Two slip rings 16, 16 are disposed in a row in the vicinity of one end of the shaft 2 and are connected to the outgoing lines 14, 14 of the winding start portion and the winding end portion of the winding 6.

Figure 2:
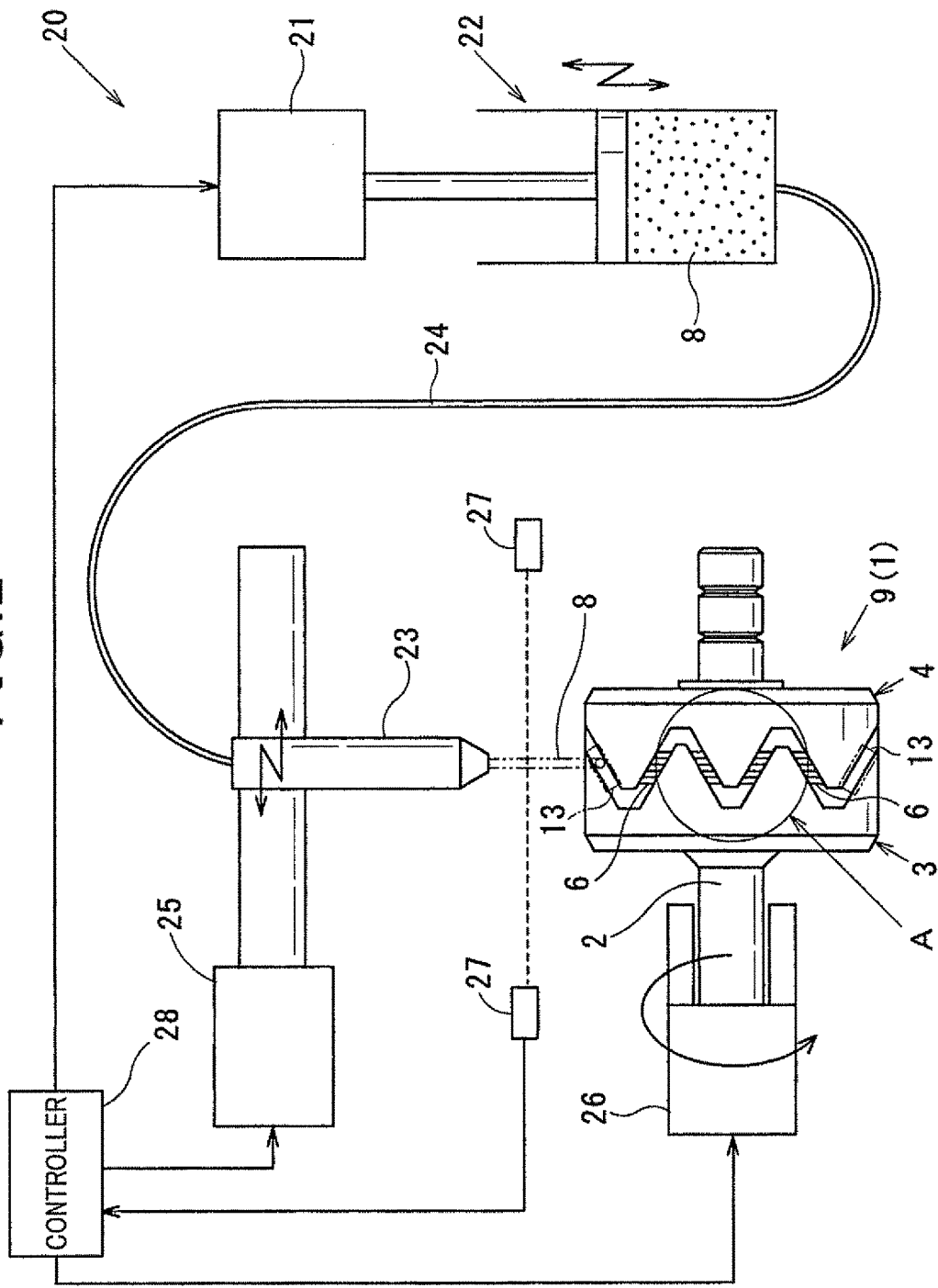
FIG. 2 is a schematic view of an apparatus for dropping resin.

FIG. 2 is a schematic view of a resin applying apparatus 20. The resin applying apparatus 20 drops and applies the thermoset resin 8 to the assembly 9, in which the magnetic coil 7 is held between the pole cores 3 and 4, thereby fixing the winding 6. The resin coating apparatus 20 includes a resin feeding unit 22, a dropping nozzle 23 for resin, and a connection flow path 24. The resin feeding unit 22 has a pressure unit 21 and feeds sol resin. The connection flow path 24 connects between the resin feeding unit 22 and the nozzle 23. The nozzle 23 is provided with a horizontal driving mechanism 25 which horizontally reciprocates the nozzle 23. A rotating unit 26 is disposed below the nozzle 23. The rotating unit 26 rotates the shaft 2 of the assembly 9 while holding the shaft 2 horizontally. A detecting unit 27 is disposed between the nozzle 23 and the assembly 9 which is a work. The detecting unit 27 detects the dropped resin. A controller 28 receives a signal from the detecting unit 27 and controls the pressure unit 21, the horizontal driving mechanism 25, and the rotating unit 26.

The resin is dropped to the assembly 9 while rotating the assembly 9 by the rotating unit 26. The liquid sol uncured resin 8 is dropped to the outer surface of the winding 6 from the nozzle 23, which is adjusted at the appropriate position by the horizontal driving mechanism 25, through the window 13. The dropped uncured resin is impregnated into the winding 6. Next, the resin impregnated into the winding 6 is heated in a furnace so as to be hardened, whereby the rotor 1 is manufactured.

Figure 3A:
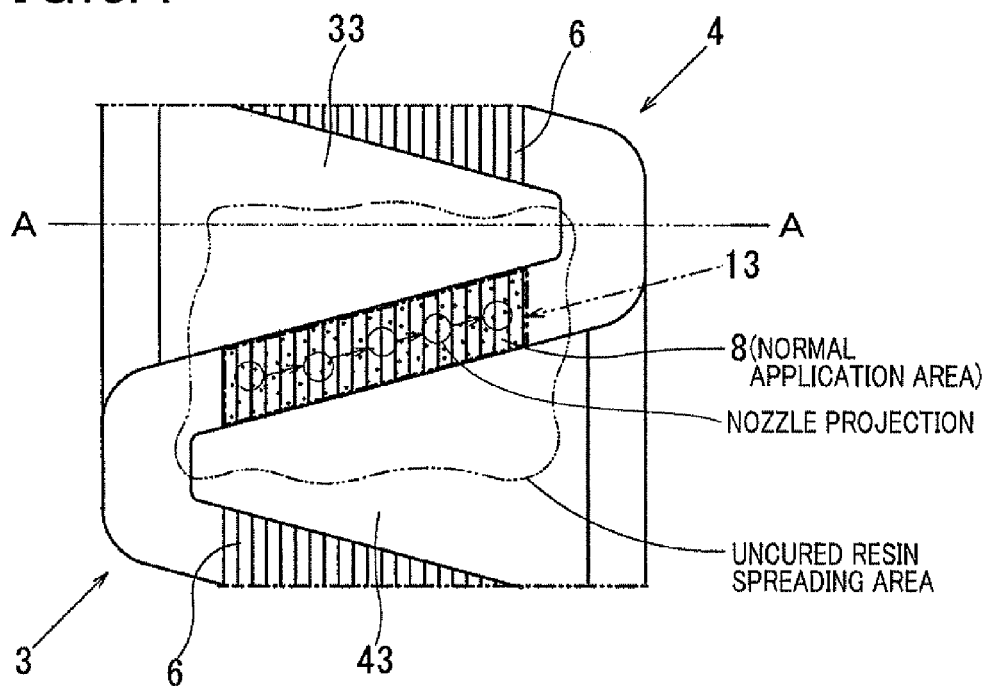
FIG. 3A is an enlarged view of the main part of FIG. 1.
Figure 3B:
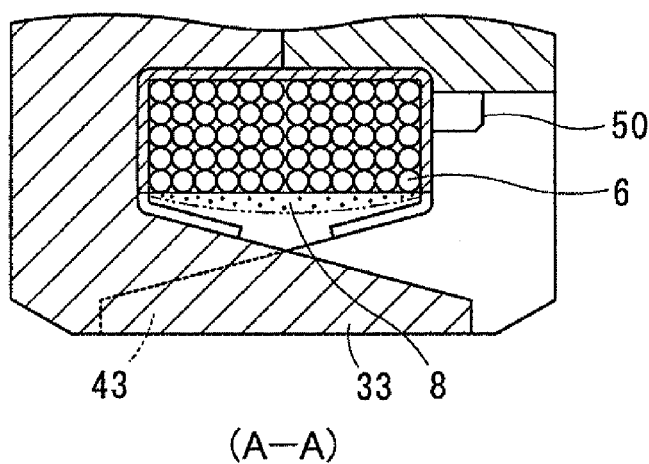
FIG. 3B is a sectional view cut along the line A-A of FIG. 3A.

FIGS. 3A and 3B show a pattern in which the uncured resin 8 is dropped to the surface of the winding 6 through the window 13.

In an embodiment, the position through which the uncured resin 8 is dropped to the surface of the winding 6 from the nozzle 23 is set to the window 13 having a substantial parallelogram shape. The resin 8 is continuously dropped only to the window 13. When the uncured resin 8 is dropped to the whole window 13, the dropped uncured resin 8 spreads and flows to the area indicated by a narrow chain double-dashed line shown in FIG. 3. In addition, the uncured resin 8 is penetrates between the lines of the winding 6 and is impregnated into the winding 6.

Hence, the uncured resin 8 is easily prevented from flowing into undesired portions, such as the bottom parts of the V-grooves 34, 44, other than the surface of the winding 6.

Figure 4A:
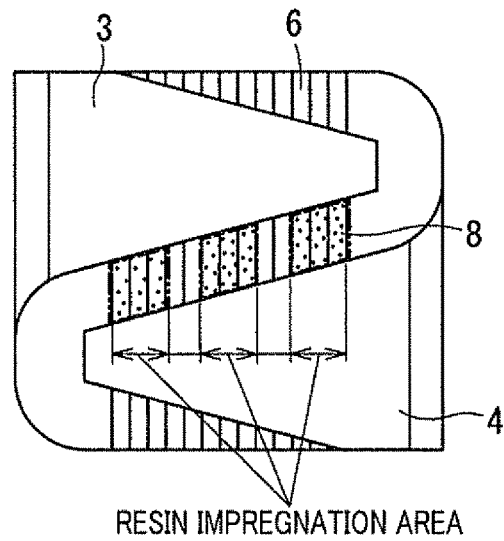
FIGS. 4A, 4B and 4C are diagrams for explaining dropping patterns.

In an embodiment, the position through which the uncured resin 8 is dropped to the surface of the winding 6 from the nozzle 23 is set to at least one part area of the window 13. The resin 8 is intermittently and selectively dropped only to the window 13. That is, the resin 8 is dropped to a portion or a plurality of portions of the outer surface of the winding 6 which have substantial parallelogram shapes corresponding to the windows 13. FIG. 4A shows a pattern in which the uncured resin 8 is dropped.

By appropriately controlling the pressure unit 21, the horizontal driving mechanism 25, and the rotating unit 26, as shown in FIG. 4A, the amount of the uncured resin dropped to the surface of the winding 6 from the nozzle 23 through the window 13, and the position on the surface of the winding 6 to which the uncured resin is dropped can be controlled freely.

Figure 4B:
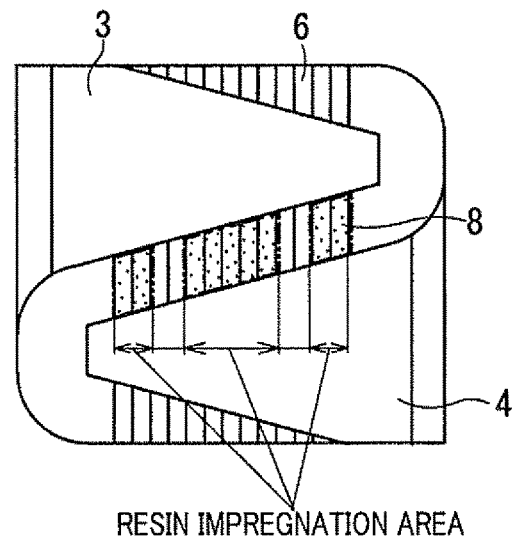

In an embodiment, as shown in FIG. 4B, a plurality of the part areas are provided. In the plurality of the areas, the area closer to the center of the outer surface of the winding 6, which has a substantial parallelogram shape corresponding to the window 13, has an area larger than those of the other areas.

According to this configuration, as shown in an A-A sectional view of FIG. 3B, resin can easily be prevented from overflowing to the outside of the magnetic coil 7 by increasing the amount of impregnation of resin at the area in the vicinity of the center of the winding 6 and by decreasing the amount of impregnation of resin at both outer ends.

Figure 4C:
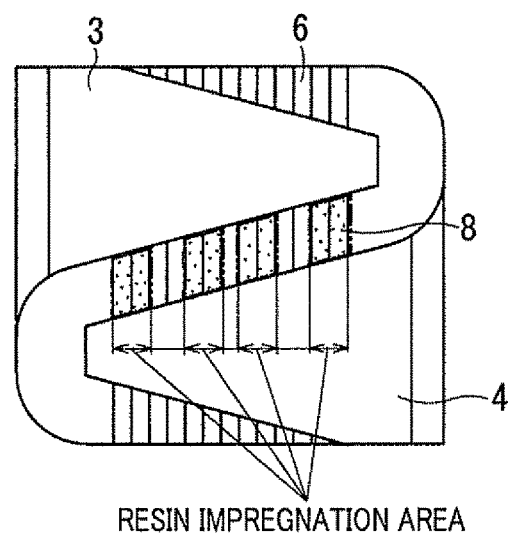

In an embodiment, as shown in FIG. 4C, a plurality of the part areas are provided. In the plurality of the areas, the areas closer to the center of the outer surface of the winding 6, which have substantial parallelogram shapes corresponding to the windows 13, have a distance between the positions at which the uncured resin 8 is dropped narrower than other distances.

In an embodiment, a plurality of the part areas are provided. In the plurality of the areas, the area closer to the center of the outer surface of the winding 6 which has a substantial parallelogram shape corresponding to the window 13 has the amount of drop of the uncured resin 8 larger than those of other areas.

This can be realized, in a dropping pattern of the uncured resin 8 shown in FIG. 3A, by decreasing movement speed of the nozzle 23 by the horizontal driving mechanism 25, or by increasing the pressure of the pressure unit 21.

According to the above configurations, resin can easily be prevented from overflowing to the outside of the magnetic coil 7 by increasing the amount of impregnation of resin at the area in the vicinity of the center of the winding 6 and decreasing the amount of impregnation of resin at both outer ends.

Figure 5A:
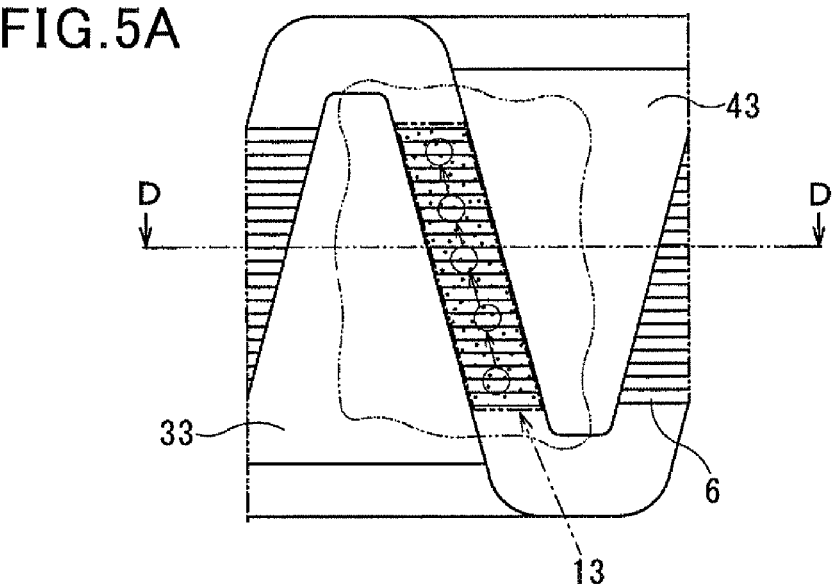
FIG. 5A is a diagram for explaining another dropping pattern.
Figure 5B:
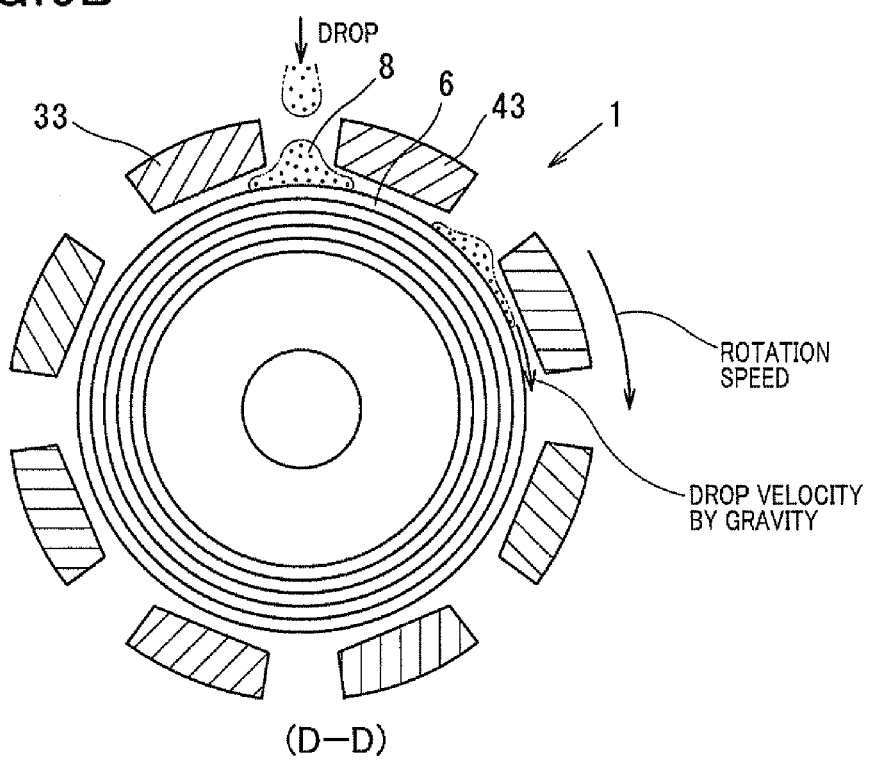
FIG. 5B is a sectional view cut along the line B-B of FIG. 5A.

In an embodiment, a spreading means for resin dropped on the surface of the winding 6 through the window 13 is the rotating unit 26 which rotates the rotor 1 (assembly 9) about the axis of the shaft 2. That is, as shown in FIG. 5, the rotor 1 is rotated so that the component of gravity in the circumferential direction is applied to the uncured resin 8 having fluidity and dropped on the cylindrical surface of the winding 6. While flowing the uncured resin 8 adhered on the cylindrical surface of the winding 6, part of the uncured resin 8 remains at the dropped position by adhesion to the surface of the winding, and other part of the uncured resin 8 spreads.

Hence, a specific mechanism is not required for spreading the dropped uncured resin 8, whereby the resin can be impregnate into the winding at low cost.

Figure 6A:
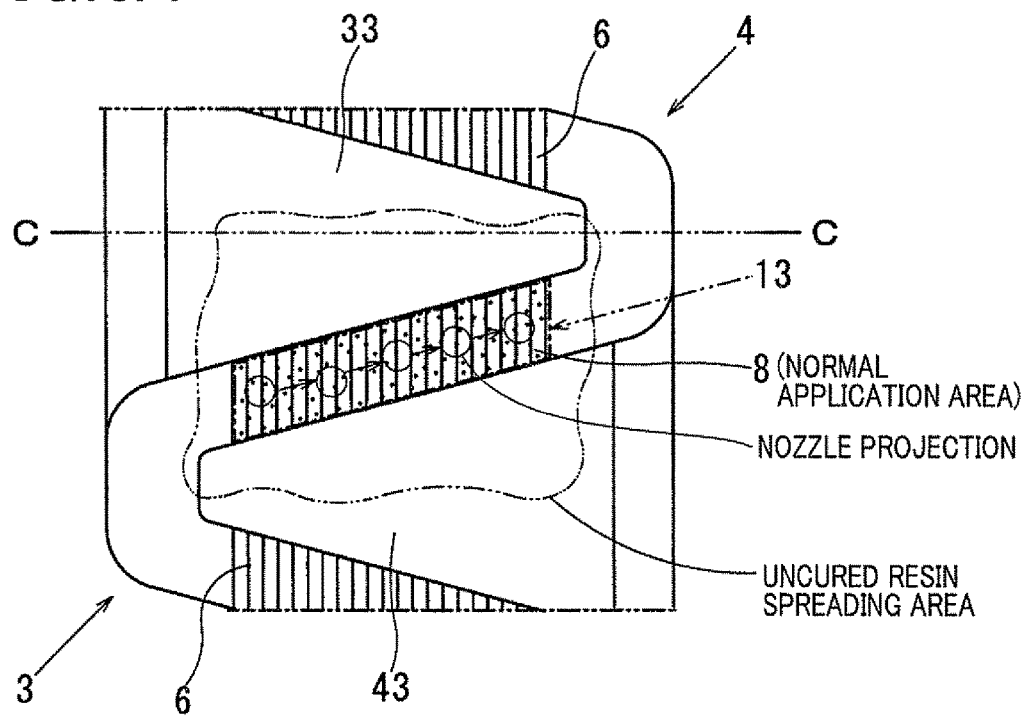
FIG. 6A is a diagram for explaining another dropping pattern.
Figure 6B:
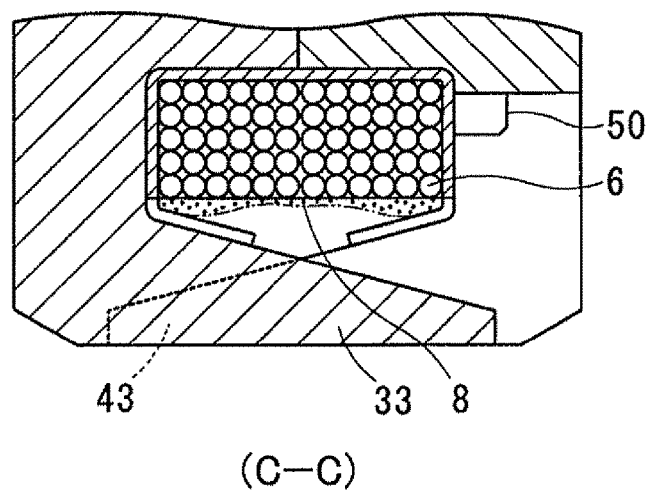
FIG. 6B is a sectional view cut along the line C-C of FIG. 6A.

In a rotor for an electric rotating machine, as shown in FIGS. 6A and 6B, the amount of the uncured resin 8 dropped to the both ends of the winding 6 is smaller than that dropped to the central part of the winding 6.

According to this configuration, when the uncured resin 8 is dropped and impregnated in normal work, a problem is prevented that the retention rate of material at the dropped position becomes large, which would easily make the film thickness of the resin impregnated into the central part of the winding 6 larger than that impregnated into the both ends of the winding, for example, when adhesion force and viscosity of the resin material are relatively large.

Figure 7A:
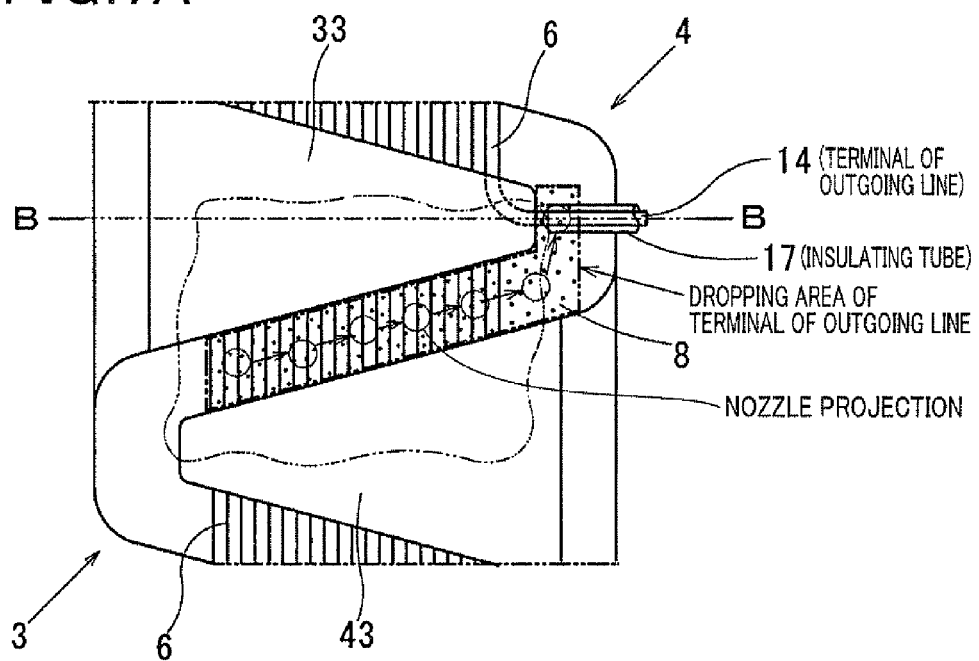
FIG. 7A is a diagram for explaining another dropping pattern.
Figure 7B:
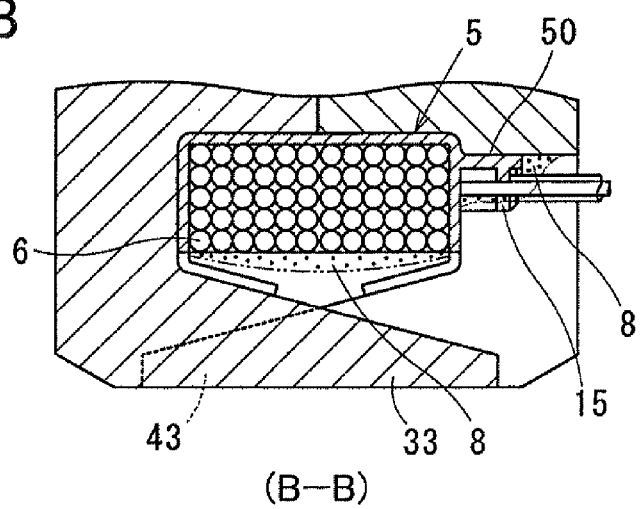
FIG. 7B is a sectional view cut along the line D-D of FIG. 7A.

In a rotor for an electric rotating machine, as shown in FIGS. 7A and 7B, the position and the amount of the uncured resin 8 dropped on the surface of the winding 6 is adjusted through the windows 13 connected to locking parts 15, which lock the two outgoing lines 14, of the protrusions 50 of the bobbin 5. Thereby, the uncured resin 8 is spread or extended not only on the surface of the winding 6 but also to the lateral surface of the locking part 15 (the surface other than the surface connected to the bottom part of the V-groove 34). Hence, the outgoing line 14 and an insulating coating tube 17 can be fixed to the locking part 15 by the thermoset resin, thereby preventing the outgoing line 14 of the winding 6 from being broken.

In a rotor for an electric rotating machine, the resin is prevented from penetrating to the protrusion 50 of the bobbin 5, which is not the locking part 15. According to this configuration, resin flows to the engagement surface between the protrusion 50 and the bottom part of the V-groove 34. When the protrusion 50 and the bottom part of the V-groove 34 fix to each other, a problem can be prevented that a crack is generated in a flange 52 with time due to a minimal relative displacement generated between the pole core 3 and the magnetic coil 7 due to the rotation of the rotor.

According to the above embodiments, dropping the uncured resin 8 to the winding 6 of the magnetic coil 7 can freely be controlled, whereby the amount of the uncured resin 8, which is applied and impregnated the winding 6 or the magnetic coil 7, can optimally be adjusted. Hence, the rotor 1 which has strong resistance against centrifugal force and magnetic oscillation can be manufactured at low cost.

It will be appreciated that the present invention is not limited to the configurations described above, but any and all modifications, variations or equivalents, which may occur to those who are skilled in the art, should be considered to fall within the scope of the present invention.

Hereinafter, aspects of the above-described embodiments will be summarized.

As an aspect of the embodiment, a method of manufacturing a rotor for an electric rotating machine is provided. The method applies and impregnates resin to a surface of a winding through windows of a wavy clearance between pawl parts opposed to each other of a pair of pole cores. Uncured resin having fluidity is dropped to at least one part area of the outer surface of the winding. The uncured resin, immediately after dropping, is spread on the outer surface of the winding, and the uncured resin adheres to the outer surface of the winding other than the part area.

By appropriately selecting the part area and the amount of drop of the uncured resin, the uncured resin is impregnated into the winding with appropriate distribution. Hence, a problem can be effectively and easily prevented that the uncured resin overflows from the magnet coil and flows to undesired portions of the magnet coil or the bottom parts of V-grooves of the pole cores.

In the method, the part area is the outer surface of the winding which has a substantial parallelogram shape corresponding to the window of a wavy clearance between the pawl parts opposed to each other of the pair of pole cores.

Sol uncured resin can easily be dropped to the outer surface of the winding, which has a substantial parallelogram shape corresponding to the window, through the window.

In the method, one or a plurality of the part areas are provided on the outer surface of the winding which has a substantial parallelogram shape corresponding to the window of a wavy clearance between the pawl parts opposed to each other of the pair of pole cores.

As a result, the impregnation area of the resin can be changed more freely in the axis direction of the magnet coil.

In the method, a plurality of the part areas are provided, and the part area closer to the center of the outer surface of the winding, which has a substantial parallelogram shape corresponding to the window, has an area larger than those of the other part areas.

The resin can easily be prevented from overflowing to the outside of the magnetic coil by increasing the amount of impregnation of the resin at the area in the vicinity of the center of the winding and by decreasing the amount of impregnation of the resin at both outer ends.

In the method, a plurality of the part areas are provided, and the part areas closer to the center of the outer surface of the winding, which has a substantial parallelogram shape corresponding to the window, have a distance therebetween narrower than other distances.

In the method, a plurality of the part areas are provided, and the part area closer to the center of the outer surface of the winding, which has a substantial parallelogram shape corresponding to the window, has the amount of drop of the uncured resin larger than those of other part areas.

According to the configurations, the resin can easily be prevented from overflowing to the outside of the magnetic coil by increasing the amount of impregnation of the resin at the area in the vicinity of the center of the winding and by decreasing the amount of impregnation of the resin at the both outer ends.

In the method, the uncured resin is spread by rotating the rotor about the axis of a shaft. The rotor is rotated so that the component of gravity in the circumferential direction is applied to the uncured resin having fluidity and dropped on the outer (cylinder) surface of the winding. Hence, the uncured resin on the cylindrical surface of the winding flows. Part of the uncured resin remains on the surface and in the inside of the winding, to which the part of the uncured resin is dropped, by adhesion, and other part of the uncured resin spreads on the surface and in the inside of the peripheral winding by force of inertia in the circumferential direction due to the rotation and the component of gravity.

According to the configuration, the resin can be spread and operated for a desired pattern by controlling the fluidity of the resin, rotation speed of the rotor, and the dropped position and the amount of drop of the resin.

As another aspect of the embodiment, a rotor manufactured by the above method is provided. The film thickness of the resin of both ends of the winding is smaller than that of the central part of the winding.

According to the configuration, a problem can be prevented that the resin is penetrate into the clearance between the bottom part of the V-groove between the pawl parts of the pole core and the protrusion of the bobbin. While the resin does not overflow to the outer end of the pole core of the rotor, the resin material which is not impregnated to the coil is prevented from being wasted. In addition, due to the adhesion between an insulating tube covering an outgoing line of a terminal of the winding and the bottom face of the pawl part, the outgoing line can be prevented from being broken.

As another aspect of the embodiment, a rotor manufactured by the above method is provided. The part area is a locking part which locks the outgoing line of the winding and is included in the protrusions provided on the outer surface of the winding which has a substantial parallelogram shape corresponding to the window and on the outer surface of the flange of the bobbin.

According to the configuration, while the resin does not overflow to the outer end of the pole core of the rotor, the resin material which is not impregnated to the coil is prevented from being wasted. In addition, a problem can be prevented that the resin is penetrated into the clearance between the bottom part of the V-groove between the pawl parts of the pole core and the protrusion of the bobbin. Furthermore, the insulating tube covering the outgoing line of the coil and the bottom surface of the pawl part can firmly be fixed to each other. Hence, the outgoing line is prevented from being broken due to vibration.

In the rotor, the resin is prevented from being impregnated into the protrusion other than the locking part, which locks the outgoing line of the coil, and included in the protrusions provided on the outer surface of the flange of the bobbin.

According to the configuration, a problem can be prevented that the resin is impregnated into a clearance between the bottom part of the V-groove of the pole core and the protrusion of the bobbin and is fixed, and a crack is generated in the bobbin.

What is claimed is:

1. A method of manufacturing a rotor for an electric rotating machine, the rotor including a Lundell type rotor core, in which a magnetic coil including a bobbin and the winding in which a conductive line is wound around the bobbin is disposed between a pair of pole cores opposed to each other, and the pole cores and the magnetic coil are fixed by a shaft, wherein
   each of the pole cores includes a cylindrical boss part, a disc part extending from an outside face of one end of the boss part, and a plurality of pawl parts extending from a periphery of the disc part to a second end of the boss part, a V-shaped groove is formed between adjacent pawl parts so as to reach the periphery of the disc part, and the pawl part of one of the pole cores is engaged with the V-shaped groove of a second one of the pole cores via a required clearance, thereby forming a wavy clearance continuous in a circumferential direction, and
   the wavy clearance has two turning parts, each of the two turning parts being turned at a lateral position of the disc part, and a window having a substantial parallelogram shape from which an outer surface of the winding is exposed, the window being formed between the two turning parts,
   the method comprising:
   dropping uncured resin only to the window having the substantial parallelogram shape, including on at least one part area of the outer surface of the winding through the window,
   spreading the uncured resin, immediately after dropping, on the outer surface of the winding, and
   impregnating the uncured resin into the outer surface of the winding other than the one part area.

2. The method according to claim 1, wherein
   the one part area is the outer surface of the winding which has a substantial parallelogram shape corresponding to the window.

3. The method according to claim 1, wherein
   the step of dropping the uncured resin on at least one part area of the outer surface of the winding through the window comprises dropping the uncured resin on a plurality of part areas of the outer surface of the winding through the window, and
   a first one of the plurality of part areas closer to a center of the outer surface of the winding than a second one of the plurality of part areas has an area larger than that of the second one of the plurality of part areas.

4. The method according to claim 1, wherein
   the step of dropping the uncured resin on at least one part area of the outer surface of the winding through the window comprises dropping the uncured resin on a plurality of part areas of the outer surface of the winding through the window, and
   two adjacent part areas of the plurality of part areas that are closer to a center of the outer surface of the winding than two other adjacent part areas of the plurality of part areas have a distance between the two adjacent part areas that is narrower than a distance between the two other adjacent part areas.

5. The method according to claim 1, wherein
   the step of dropping the uncured resin on at least one part area of the outer surface of the winding through the window comprises dropping the uncured resin on a plurality of part areas of the outer surface of the winding through the window, and
   a first one of the plurality of part areas closer to a center of the outer surface of the winding than a second one of the plurality of part areas has an amount of drop of the uncured resin larger than that of the second one of the plurality of part areas.

6. The method according to claim 1, wherein
   the uncured resin is spread by rotating the Lundell type rotor core about an axis of a shaft, the Lundell type rotor core is rotated so that a component of gravity in the circumferential direction is applied to the uncured resin having fluidity and dropped on the outer surface of the winding to allow the uncured resin to flow, whereby part of the uncured resin remains at the dropped position of the winding by adhesion to the winding, and another part of the uncured resin spreads to areas other than the dropped position.

7. A rotor manufactured by the method according to claim 1, wherein
   a film thickness of the uncured resin of both ends of the winding is smaller than that of a central part of the winding.

8. A rotor manufactured by the method according to claim 1, wherein
   the bobbin has a body around which the winding is wound, two collar parts extending from both ends of the body to an outside in a radial direction, and a number of tongue parts extending in the radial direction from peripheries of the collar parts, a lateral surface of one of the collar parts is provided with a protrusion which engages with a bottom part of the V-groove of the pole core to stop the bobbin from rotating, and part of the protrusion serves as a locking part which locks an outgoing line of the winding, whereby the uncured resin is impregnated into the locking part.

9. The rotor manufactured by the method according to claim 8, wherein
the uncured resin is not impregnated into the protrusion other than the locking part.

10. The method according to claim 1, wherein
the resin is intermittently and selectively dropped to a plurality of portions of the outer surface of the winding.

* * * * *